United States Patent
Peduto et al.

(10) Patent No.: US 6,930,165 B2
(45) Date of Patent: *Aug. 16, 2005

(54) MODIFIED POLYAMIDES, COMPOSITIONS BASED ON SAME AND MACROMOLECULAR COMPOUNDS USED TO OBTAIN THEM

(75) Inventors: Nicolangelo Peduto, Cesano Maderno (IT); Franco Speroni, I-Italie Ceriano Laghetto (IT); Haichun Zhang, Saronno (IT)

(73) Assignee: Rhodia Engineering Plastics S.r.l., Ceriano Laghetto (IT)

(*) Notice: Subject to any disclaimer, the term of this patent is extended or adjusted under 35 U.S.C. 154(b) by 61 days.

This patent is subject to a terminal disclaimer.

(21) Appl. No.: 10/311,541

(22) PCT Filed: Jun. 15, 2001

(86) PCT No.: PCT/EP01/06736

§ 371 (c)(1),
(2), (4) Date: Jul. 18, 2003

(87) PCT Pub. No.: WO01/96474

PCT Pub. Date: Dec. 20, 2001

(65) Prior Publication Data

US 2004/0024115 A1 Feb. 5, 2004

(30) Foreign Application Priority Data

Jun. 16, 2000  (FR) ............................ 00 07706

(51) Int. Cl.[7] ............................ C08G 69/02; C08J 3/00; C08L 77/00

(52) U.S. Cl. ........................ 528/310; 528/170; 528/322; 528/332; 528/335; 528/336; 525/422; 525/432; 524/600; 524/602; 524/606

(58) Field of Search ................................ 528/170, 310, 528/332, 322, 335, 336; 525/422, 432; 524/606, 600, 602

(56) References Cited

U.S. PATENT DOCUMENTS

| | | | | |
|---|---|---|---|---|
| 6,160,080 A | * | 12/2000 | Cucinella et al. | 528/170 |
| 6,500,881 B1 | * | 12/2002 | Galli et al. | 523/205 |
| 6,525,166 B1 | * | 2/2003 | Di Silvestro et al. | 528/310 |
| 6,608,123 B2 | * | 8/2003 | Galli et al. | 524/100 |
| 2004/0030057 A1 | * | 2/2004 | Peduto et al. | 525/418 |
| 2004/0054122 A1 | * | 3/2004 | Di Silvestro et al. | 528/310 |

FOREIGN PATENT DOCUMENTS

| | | |
|---|---|---|
| EP | 0 672 703 A | 9/1995 |
| FR | 2 743 077 A | 7/1997 |
| FR | 2 766 197 A | 1/1999 |
| FR | 2 779 730 A | 12/1999 |

* cited by examiner

*Primary Examiner*—P. Hampton Hightower
(74) *Attorney, Agent, or Firm*—Burns, Doane, Swecker & Mathis, L.L.P.

(57) ABSTRACT

The invention concerns polyamides modified by a multifunctional compound. Finished articles formed from said polyamides or from compositions based on said polyamides exhibit excellent mechanical properties, and a very good surface appearance. The modified polyamide is obtained by mixing in melted form a polyamide and a polyamide macromolecular compound comprising star-shaped or H-shaped macromolecular chains.

18 Claims, No Drawings

MODIFIED POLYAMIDES, COMPOSITIONS BASED ON SAME AND MACROMOLECULAR COMPOUNDS USED TO OBTAIN THEM

The present invention relates to polyamides modified with a multifunctional compound. Finished articles shaped from these polyamides or from compositions based on these polyamides have excellent mechanical properties and also a very good surface aspect. The invention also relates to a macromolecular compound that is useful for obtaining these polyamides.

In the field of technical plastics, it is often sought to modify polymer compositions in order to impart advantageous properties to articles shaped therefrom or from compositions comprising them. The mechanical properties and the surface aspect of the articles are examples of properties observed on the articles.

Polymer compositions often comprise fillers intended to modify the mechanical properties or to reduce the costs of the material. If the fillers are present in large amount, the surface aspect of the articles obtained may become unsatisfactory.

Patent FR 98/15878 (2 743 077) describes compositions comprising fillers and a polyamide modified with a multifunctional compound. The polyamide at least partially has a macromolecular structure in starburst form with repeating units of polyamide-6 type. Such compounds are known as starburst polyamides. These polyamides have a high melt flow index, which makes it possible to increase the filler content in the composition without deteriorating the surface aspect, i.e. without being able to observe the fillers at the surface of the articles. The polyamide is obtained by copolymerization of a multifunctional compound with monomers of amino acid or lactam type. The patent describes the use of mixtures of these compositions with polyhexamethylene adipamide, as matrices for compositions containing fillers.

The articles made from these compositions comprising a filler and a matrix consisting of a polymer modified in accordance with these documents have good mechanical properties, and a surface that does not leave the fillers showing. However, the surface aspect is dull.

In many fields, for example in the field of motor vehicle bodywork, it is sought to obtain articles whose surface aspect is shiny or at the surface of which good reflectivity of light is observed.

One object of the present invention is to propose a novel modified polyamide which, when used as a matrix with fillers, makes it possible to obtain articles whose surfaces show good reflectivity. An object of the invention is thus also to propose filled compositions that have an excellent surface aspect. The invention also proposes a process for obtaining such compositions.

An object of the invention is also to propose a macromolecular compound that may be used in polymer compositions, and more particularly in polyamide compositions, and which gives them modified properties.

To this end, the invention firstly proposes a modified polyamide obtained by melt-blending at least the following two compounds:

Compound A: a polyamide containing repeating units whose formulae are chosen from formulae (I) and (II) below:

—[NH—R₁—NH—OC—R₂—CO]—     (I)

—[NH—R₃—CO]—     (II)

the radicals $R_1$, $R_2$ and $R_3$ being hydrocarbon-based radicals optionally comprising hetero atoms Compound B: a polyamide macromolecular compound comprising starburst or H macromolecular chains, which may be obtained by a process chosen from the following two processes:
Process A: copolymerization of a lactam and/or of an amino acid with a multifunctional compound and optionally bifunctional or monofunctional compounds,
Process B: melt-blending of a multifunctional compound and a polyamide of the type obtained by polycondensation of lactams and/or of amino acids,
the multifunctional compound comprising at least three reactive functions chosen from amines, carboxylic acids and derivatives thereof, the reactive functions being identical, the equivalent molar concentration of reactive functions of the multifunctional compound in compound B being greater than 4%.

The starburst or H macromolecular chains comprise a core and at least three polyamide branches. The branches are linked to the core via a covalent bond, by means of an amide group or a group of some other nature. The core is an organic or organometallic chemical compound, preferably a hydrocarbon-based compound optionally comprising hetero atoms and to which are attached the branches. The branches are polyamide chains. They may contain branching, and this is especially the case for the H-shaped structures. The polyamide chains constituting the branches are preferably of the type obtained by polymerization of lactams or amino acids, for example of polyamide-6 type. As a guide, compounds containing an "H" structure are described, for example, in document U.S. Pat. No. 5,959,069.

Compound B optionally comprises, in addition to the starburst chains, linear polyamide macromolecular chains. The weight ratio between the amount of starburst chains in the matrix and the sum of the amounts of starburst and linear chains is between 1 and 0.1, limits included. It is preferably between 0.9 and 0.6.

The melt-blending process consists in placing the compounds in contact at a temperature above the melting point of the least fusible of these compounds. This temperature is preferably greater than 250° C.

According to one particularly advantageous embodiment, the melt-blending is performed using an extrusion device, for example a single-screw or twin-screw device.

Such devices are commonly used in the fields of technical plastics formulation and are well known to those skilled in the art. They are suitable for the melt-blending of compounds A and B and for performing process B.

One of the characteristics of the polyamides according to the invention is the equivalent molar concentration of terminal functions in compound B. This magnitude is representative of the amount of modifier introduced, relative to the linear repeating units or to the monomers leading to linear repeating units. This magnitude, written as Δ, is defined in the following two ways, depending on the process for obtaining compound B:

$$\text{Process } A: \quad \alpha = f * \frac{m_C / M_C}{0.9 * m_L / M_L + m_C / M_C}$$

$$\text{Process } B: \quad \alpha = f * \frac{m_C / M_C}{m_{PA} / M_{PA} + m_C / M_C}$$

in which:
f is the number of reactive functions in the multifunctional compound
$m_L$ is the mass of lactam and/or amino acid used to obtain compound B according to process A $m_{PA}$ is the mass of polyamide used to obtain compound B according to process B $m_C$ is the mass of multifunctional compound used to obtain compound B according to processes A or B $M_L$ is the molar mass of the lactam and/or amino acid $M_{PA}$ is the molar mass of a repeating unit in the polyamide used to obtain compound B according to process B $M_C$ is the molar mass of compound C.

According to one preferred characteristic of the invention, the equivalent molar concentration of reactive functions of the multifunctional compound in compound B is greater than 8%.

An equivalent molar concentration of reactive functions of the multifunctional compound is also defined relative to compounds A and B. This magnitude is representative of the amount of modifier introduced into the blend of compounds A and B. This magnitude, written as β, is defined in the following two ways, depending on the process for obtaining compound B:

$$\beta = \frac{\alpha * m_B / M_B}{m_A / M_A + m_B / M_B}$$

in which $m_B$ and $m_A$ are, respectively, the masses of compounds B and A $M_A$ is a characteristic molar mass of compound A, $M_A$ being equal to the molar mass of a repeating unit of polyamide represented by formula (II), $M_A$ being equal to half the molar mass of a repeating unit of polyamide represented by formula (I)

$M_B$ is a characteristic molar mass of compound B, $M_B$ being equal to the molar mass of the repeating unit corresponding to lactam and/or amino acid used for process A, $M_B$ being equal to the molar mass of a repeating unit of polyamide used for process B.

According to one preferred characteristic of the invention, the equivalent molar concentration of reactive functions of the multifunctional compound relative to compounds A and B is greater than 1%.

According to another preferred characteristic of the invention, compound B has a melt flow index measured according to standard ISO 1133 at 275° C. under a 100 g load of greater than 100 g/10 min.

According to another preferred characteristic, the weight proportion of compound A in the blend of compounds A and B is greater than 50%.

Compound A may advantageously be chosen from polyamide-6, polyamide-11, polyamide-12, polyamide-66, polyamide-6.12, polyamide-4.6, polyamide-6.10, polyamide-6.36 and polyterephthalamide, and blends and copolymers thereof.

According to one preferred mode of the invention, compound A is a polyamide 6 or 66 comprising at least 95 mol % of repeating units of PA-6 or of PA-66, respectively. In particular, compound A may comprise repeating units of PA-66 or of PA-6, respectively.

According to the particular embodiment in which compound A is a polyamide of the type whose repeating units are represented by formula (I), the modified polyamide has excellent thermomechanical properties and also a high melt flow index. The modified polyamides according to this embodiment or the compositions comprising these polyamides in particular have a high deformation temperature under load.

This property, inter alia, may make the material able to withstand processes for placing in paint by cataphoresis. The compositions are thus particularly suitable for producing bodywork components.

The invention also relates to compositions comprising fillers, preferably mineral fillers, and a matrix consisting of modified polyamide. The weight proportion of the fillers in the composition is preferably between 25% and 80%. The filled compositions may be produced by introducing the molten fillers into an extrusion device, during the production of the blend of compounds A, B or subsequently by remelting or extruding a modified polyamide obtained by blending the compounds A, B.

The preferred mineral fillers are chosen from glass fibres, carbon fibres, ceramic fibres, talc, kaolin, wollastonite and exfoliated clays.

The compositions may contain other additives such as flame retardants, lubricants, wollastonite stabilizers, resilience modifiers, pigments, colorants, antioxidants and plasticizers.

Examples of flame-retardant compounds that may be mentioned include red phosphorus, melamine derivatives such as melamine phosphate, polyphosphate or pyrophosphate, halogenated compounds, more particularly brominated compounds, and compounds based on magnesium hydroxide.

Examples of resilience modifiers that may be mentioned include elastomers, optionally grafted with maleic anhydride, such as EPDMs, EPRs and SEBSs, silicone elastomers and nitrile rubbers.

These examples have no limiting nature.

Many multifunctional compounds may be used to carry out the invention. These compounds are organic or organometallic compounds containing at least three reactive chemical functions, all the reactive functions being identical. These functions are chosen from amines, carboxylic acids and derivatives thereof. The term "reactive function" means a function capable of reacting with a terminal function of the polyamide chains of compounds A and/or B. These compounds are capable, for example, of forming amide bonds.

The multifunctional compounds may be chosen from compounds with an arborescent or dendritic structure.

The multifunctional compounds may also be chosen from compounds of formula (III)

$$R4-[-A-X-H]_m \qquad (III)$$

in which

A is a covalent bond or an aliphatic hydrocarbon-based radical possibly containing hetero atoms, and containing from 1 to 20 carbon atoms and preferably from 1 to 6 carbon atoms;

X is a radical

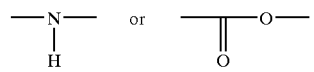

$R_4$ is a linear or cyclic, aromatic or aliphatic hydrocarbon-based radical containing at least two carbon atoms and possibly containing hetero atoms;

m is an integer between 3 and 8 (limits included).

According to yet another preferred characteristic, the radical $R_4$ is either a cyclo-aliphatic radical such as the tetravalent cyclohexa-nonyl radical, or a 1,1,1-triylpropane or 1,2,3-triyl-propane radical.

As other radicals $R_4$ that may be suitable for the invention, examples that may be mentioned include substituted or unsubstituted cyclohexanyl and phenyl trivalent radicals, diaminopolymethylene tetravalent radicals with a number of methylene groups advantageously between 2 and 12, such as the radical derived from EDTA (ethylenediaminotetraacetic acid), cyclohexanonyl or cyclohexadinonyl octavalent radicals, and radicals derived from compounds obtained from the reaction of polyols such as glycol, pentaerythritol, sorbitol or mannitol with acrylonitrile.

The radical A is preferably a methylene or polymethylene radical such as ethyl, propyl or butyl radicals, or a polyoxyalkylene radical such as the polyoxyethylene radical.

According to one preferred embodiment of the invention, the number m is greater than 3 and advantageously equal to 3 or 4.

The reactive function of the multifunctional compound represented by the symbol X—H is a function capable of forming an amide function.

As examples of polyfunctional compounds of formula III, mention may be made of 2,2,6,6-tetra(β-carboxyethyl) cyclohexanone, diaminopropane-N,N,N',N'-tetraacetic acid of the following formula:

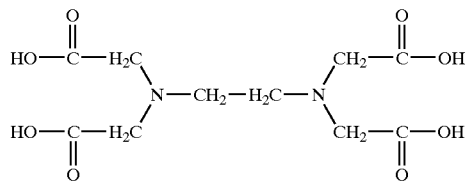

or compounds derived from the reaction of trimethylolpropane or of glycerol with propylene oxide and amination of the terminal hydroxyl groups; the latter compounds are sold under the trade name Jeffamines T® by the company Huntsman, and have the general formula:

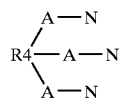

in which:
R$_4$ represents a 1,1,1-triylpropane or 1,2,3-triylpropane radical,
A represents a polyoxyethylene radical.

Examples of multifunctional compounds that may be suitable are especially mentioned in document U.S. Pat. No. 5,346,984, in document U.S. Pat. No. 5,959,069, in document WO 96/35739 and in document EP 672 703.

The following may be mentioned more particularly: nitrilotrialkylamines, in particular nitrilotriethyl-amine, dialkylenetriamines, in particular diethylene-triamine, trialkylenetetramines and tetraalkylene-pentamines, the alkylene preferably being ethylene, 4-aminoethyl-1,8-octanediamine.

Mention is also made of the dendrimers of formula (II)

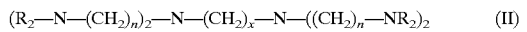

in which
R is a hydrogen atom or a group —(CH$_2$)$_n$—NR$^1{}_2$ in which
R$^1$ is a hydrogen atom or a group —(CH$_2$)$_n$—NR$^2{}_2$ in which
R$^2$ is a hydrogen atom or a group —(CH$_2$)$_{n-NR^3{}_2}$ in which R$^3$ is a hydrogen atom or a group —(CH$_2$)$_n$—NH$_2$,
n being an integer between 2 and 6,
x being an integer between 2 and 14,
n is preferably an integer between 3 and 4, in particular 3, and x is preferably an integer between 2 and 6, preferably between 2 and 4, in particular 2.

Each radical R may be chosen independently of the others. The radical R is preferably a hydrogen atom or a group —(CH$_2$)$_n$—NH2.

Mention is also made of multifunctional compounds containing 3 to 10 carboxylic acid groups, preferably 3 or 4. Among these, the ones that are preferred are the compounds containing an aromatic and/or heterocyclic ring, for example benzyl, naphthyl, anthracenyl, biphenyl and triphenyl radicals, or heterocycles, for instance pyridine, bipyridine, pyrrole, indole, furan, thiophene, purine, quinoline, phenanthrene, porphyrin, phthalocyanine and naphthalocyanine. 3,5,3',5'-Biphenyltetracarboxylic acid, acids derived from phthalocyanine and from naphthalocyanine, 3,5,3',5'-biphenyltetracarboxylic acid, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid and 1,3,6,8-acridinetetracarboxylic acid are most particularly preferred, and even more particularly trimesic acid and 1,2,4,5-benzenetetracarboxylic acid.

Mention is also made of multifunctional compounds whose core is a heterocycle containing a point of symmetry, for instance 1,3,5-triazines, 1,4-diazines, melamine, compounds derived from 2,3,5,6-tetraethylpiperazine, 1,4-piperazines and tetrathiafulvalenes. Mention is made more particularly of 2,4,6-triaminocaproic acid 1,3,5-triazine (TACT).

The invention also relates to a novel macromolecular compound which may be used especially to obtain modified polymers, for example to obtain modified polyamides. The macromolecular compound comprises starburst macromolecular chains and possibly linear macromolecular chains. It is obtained by copolymerizing a lactam and/or an amino acid with a multifunctional compound and optionally bifunctional or monofunctional compounds, the multifunctional compound comprising at least three reactive functions chosen from amines, carboxylic acids and derivatives thereof, the reactive functions being identical, the equivalent molar concentration of reactive functions of the multifunctional compound in the compound being greater than 4%.

The compounds obtained from caprolactam are most particularly preferred. According to another characteristic, the compounds that are preferred are those whose melt flow index measured according to standard ISO 1133 at 275° C. under 100 g of load is greater than 100 g/10 min.

Multifunctional compounds that may be used to obtain them have been described previously.

Other details or advantages of the invention will emerge more clearly in the light of the examples given below, solely as a guide.

Compounds Used:
Compound A1: a polyamide-66 with a relative viscosity (formic acid) of 50, sold by the company Rhodia Engineering Plastics.
Compound B1: a starburst polyamide prepared as mentioned below:
A polymerization is performed in a heated autoclave and comprising heating means.
11 330 g of caprolactam and 1 750 g of 2,2,6,6-tetra(β-carboxyethyl)cyclohexanone are added to the autoclave with 350 g of distilled water.

The cyclohexanone compound and the process for synthesizing it are described in the article "The Chemistry of Acrylonitrile II—Reactions with Ketones" JACS 64 2850 (1942) by Herman Alexander Buison and Thomas W. Riener.

The mixture is heated, with stirring, to a temperature of 265° C. under 6 bar.

It is maintained at this temperature and pressure for 2 hours.

The pressure is then reduced and the autoclave is then flushed with nitrogen for variable times, while keeping the temperature at 265° C.

The molten macromolecular compound obtained is poured into a large volume of water at 0° C., with stirring. A powder is obtained.

The powder is washed with distilled water for about 16 hours to remove the unpolymerized caprolactam, and is dried at 100° C. under vacuum for 48 hours.

The melt flow index MFI is measured: 202 g/10 min.
Compound B2: a starburst polyamide prepared as mentioned below:

A polymerization is performed in a heated autoclave comprising stirring means.

11 300 g of caprolactam and 175 g of 2,2,6,6-tetra(β-carboxyethyl)cyclohexanone are added to the autoclave with 350 g of distilled water.

The cyclohexanone compound and the process for synthesizing it are described in the article "The Chemistry of Acrylonitrile II—Reactions with Ketones" JACS 64 2850 (1942) by Herman Alexander Buison and Thomas W. Riener.

The mixture is heated, with stirring, to a temperature of 265° C. under 6 bar.

It is kept at this temperature and pressure for 2 hours.

The pressure is then reduced and the autoclave is then flushed with nitrogen for variable times, while keeping the temperature at 265° C.

The molten polymer is then extruded in the form of a rod and then cooled rapidly with water and cut into granules.

These granules are washed with distilled water for about 16 hours to remove the unpolymerized caprolactam, and dried at 100° C. under vacuum for 48 hours.

The melt flow index MFI is measured: 25 g/10 min.
Compound B3: a polyamide-6 with a relative viscosity (sulphuric acid) of 2.7, sold by the-company Rhodia Engineering Plastics.
Compound C: Wollastonite wicroll 10 PA.
Compound D: lubricant and carbon black
Assessments Melt flow index MFI determined according to standard ISO 1133 at 275° C. under a 100 g load.

The surface aspect is observed on samples in the form of sheets of 15 cm by 10 cm, and 5 mm thick. Two criteria are assessed visually: the observation of fillers at the surface of the sheets, and the reflectivity of the sheet.

EXAMPLES

The compositions are obtained by blending in a twin-screw extruder of Werner & Pfleiderer ZSK type.

The compositions prepared are detailed in Table I. The proportions are given as weight percentages in the composition.

TABLE I

| Compound | Example 1 | Example 2 | Example 3 | Example 4 |
|---|---|---|---|---|
| A1 | 38.7 | 38.7 | 38.7 | 38.7 |
| B1 | 20 | 0 | 0 | 0 |
| B2 | 0 | 20 | 0 | 0 |
| B3 | 0 | 0 | 20 | 0 |
| C | 40 | 40 | 40 | 40 |
| D | 1.3 | 1.3 | 1.3 | 1.3 |

The properties are mentioned in Table II.

TABLE II

| Property | Example 1 | Example 2 | Example 3 | Example 4 |
|---|---|---|---|---|
| Observation of fillers at the surface | NO | YES | YES | YES |
| Reflectivity | YES | NO | NO | NO |
| Equivalent molar concentration of reactive functions of the multi-functional compound in compound B | 20% | 2% | 0% | 0% |
| Equivalent molar concentration of reactive functions of the multi-functional compound in the blend A and B | 7% | 7% | 0% | 0% |

These examples show that compositions based on polyamide-66 modified by introduction of starburst polyamide melt obtained with large amounts of multifunctional compound have an improved surface aspect.

What is claimed is:

1. Modified polyamide comprising at least the following two compounds which are melt-blended together:

Compound A: a polyamide comprising repeating units whose formulae are selected from the group consisting of formulae (I) and (II) below:

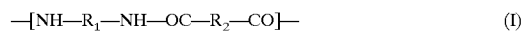

—[NH—R$_1$—NH—OC—R$_2$—CO]—    (I)

—[NH—R$_3$—CO]—    (II)

the radicals R$_1$, R$_2$ and R$_3$ being hydrocarbon-based radicals optionally comprising hetero atoms Compound B: a polyamide macromolecular compound comprising starburst or H macro-molecular chains, which may be obtained by a process selected from the group consisting of the following two processes:

Process A: copolymerization of a lactam and/or of an amino acid with a multifunctional compound and optionally bifunctional or mono-functional compounds, Process B: melt-blending of a multifunctional compound and a polyamide obtained by polycondensation of lactams and/or of amino acids, the multifunctional compound comprising at least three reactive functions selected from the group consisting of amines, carboxylic acids and derivatives thereof, the reactive functions being identical, the equivalent molar concentration of reactive functions of the multifunctional compound in compound B being greater than 4%.

2. Modified polyamide according to claim 1, wherein the equivalent molar concentration of reactive functions of the multi-functional compound in compound B is greater than 8%.

3. Modified polyamide according to claim 1, wherein the equivalent molar concentration of reactive functions of the multi-functional compound relative to compounds A and B is greater than 1%.

4. Modified polyamide according to claim 1, wherein the weight proportion of compound A in the blend of compounds A and B is greater than 50%.

5. Modified polyamide according to claim 1, wherein the melt-blending is performed in an extrusion device.

6. Modified polyamide according to claim 1, wherein the process selected to obtain compound B is process B, and in that the melt-blending is performed in an extrusion device.

7. Modified polyamide according to claim 1, wherein the multifunctional compound has an arborescent or dendritic structure.

8. Modified polyamide according to claim 1, wherein the multi-functional compound is represented by formula (III)

in which

A is a covalent bond or an aliphatic hydrocarbon-based radical optionally containing hetero atoms, and containing from 1 to 20 carbon atoms;

—X is a radical

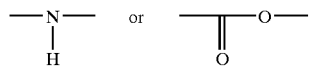

—$R_4$ is a linear or cyclic, aromatic or aliphatic hydrocarbon-based radical containing at least two carbon atoms and optionally containing hetero atoms;

m is an integer between 3 and 8, limits included.

9. Modified polyamide according to claim 8, wherein the multifunctional compound is selected from the group consisting of 2,2,6,6-tetra (β-carboxyethyl)cyclohexanone, trimesic acid, 2,4,6-tri(aminocaproic acid)-1,3,5-triazine and 4-aminoethyl-1,8-octanediamine.

10. Modified polyamide according to claim 1, wherein compound A is selected from the group consisting of polyamide-6 and polyamide-66, and copolymers and blends thereof.

11. Modified polyamide according to claim 1, wherein compound B is obtained by process A, the lactam being caprolactam, or by process B, the polyamide being polyamide-6.

12. Composition comprising a matrix and at least one filler, wherein the matrix is a modified polyamide according to claim 1.

13. Composition according to claim 12, wherein the filler is selected from the glass fibres, carbon fibres, kaolin, wollastonite and talc.

14. Composition according to claim 12, wherein the weight proportion of filler is between 25% and 80%.

15. Polyamide macromolecular compound comprising starburst macromolecular chains and optionally linear macromolecular chains, obtained by copolymerization of a lactam and/or of an amino acid with a multifunctional compound and optionally bifunctional or monofunctional compounds, the multi-functional compound comprising at least three reactive functions selected from the group consisting of amines, carboxylic acids, and derivatives thereof, the reactive functions being identical, the equivalent molar concentration of reactive functions of the multifunctional compound in the compound being greater than 4%.

16. Macromolecular compound according to claim 15, wherein the melt flow index, measured according to standard ISO 1133 at 275° C. under a 100 g load, is greater than 100 g/10 min.

17. Macromolecular compound according to claim 15, wherein the multifunctional compound is a multifunctional compound.

18. A polymer composition comprising an effective amount of a macromolecular compound according to claim 15.

* * * * *